Patented Jan. 20, 1925.

1,523,600

UNITED STATES PATENT OFFICE.

CHARLES E. LINEBARGER, OF CHICAGO, ILLINOIS.

NONCONDUCTING SUBSTANCE.

No Drawing.    Application filed June 25, 1921.   Serial No. 480,470.

*To all whom it may concern:*

Be it known that I, CHARLES E. LINEBARGER, a citizen of the United States, residing at Chicago, in the county of Cook and State of Illinois, have invented certain new and useful Improvements in Nonconducting Substances, of which the following is a specification.

This invention relates to compositions of matter, and it has for its object the production of a composition that is not acted upon by water or acid solutions, and that at high temperatures becomes plastic enough to allow its being shaped or molded into various forms, and to become sufficiently hard when cold to retain the form. A further object is the production of a substance that is a poor conductor of heat and electricity, and one that may be used in impregnating fibrous material.

My composition consists of a mixture of a vegetable adhesive material insoluble in water, such as resin; an animal adhesive material insoluble in water, such as stearic acid; and a fibrous material which may be of animal origin such as wool or hair, or of vegetable origin such as cellulose fiber, or of mineral origin such as asbestos. In combination with these substances a filling material may be used such as mica, talc, wood flour, or slate.

In preparing the composition I prefer to use the following ingredients and in about the following proportions: namely, thirty pounds of resin, ten pounds of stearic acid, ten pounds of asbestos fiber, and with this, if desired, five pounds of talc. The benefits of my invention may be obtained, however, when any of the ingredients are varied within the following limits: resin, from ten to forty pounds; stearic acid from five to twenty pounds; fiber, from five to twenty pounds, and, if a filler is added, from one to ten pounds. I also prefer to use resins which are soluble in fused stearic acid.

The composition may be formed by melting the resin and stearic acid together and then thoroughly mixing with these substances the binding material and also the filling material if desired. The product while hot is introduced into molds, pressure being applied if desired, and, when the substance is sufficiently cool, it may be removed from the molds. If desired the resin and acid may be fused together; then cooled; then reduced to a pulverized or granulated condition; then mixed with the fibrous material and filler. The substance may be then put under great pressure and molded into the form desired, the substance at the same time being heated somewhat. Also the fibrous material may be impregnated with the molten resin and stearic acid by immersing it in the fused mixture and then molding the resultant substance into the shape desired. Or, the binding material may be molded into shape, and then placed in the molten mixture, so that the entire structure will become impregnated with the mixture.

My composition formed from these materials by any of the processes specified, or any similar process, is impervious to water and solutions of acid, and is an efficient nonconductor of heat and electricity. It also retains a very fine impression in the molds in which it is formed, and has great tensile strength, and hence is adapted to a variety of uses. By adding from two to five per cent of lime its hardness is increased and its melting point is raised.

I claim as my invention:

1. A non-conducting substance comprising a mixture of resin, stearic acid, and a fibrous material in substantially the following proportions: ten to forty pounds of resin, five to twenty pounds of stearic acid, and five to twenty pounds of a fibrous material.

2. A composition of matter comprising an intimate mixture in substantially the following proportions: thirty pounds of resin, ten pounds of stearic acid, and ten pounds of asbestos.

3. A composition of matter comprising an intimate mixture in substantially the following proportions: thirty pounds of resin, ten pounds of stearic acid, ten pounds of asbestos, and five pounds of talc.

4. A composition of matter comprising an intimate mixture in the proportions of substantially thirty pounds of resin, which is soluble in stearic acid, ten pounds of stearic acid, and ten pounds of fibrous material.

In testimony whereof, I hereunto set my hand.

CHARLES E. LINEBARGER.